(12) United States Patent
Sampson et al.

(10) Patent No.: US 11,802,048 B2
(45) Date of Patent: *Oct. 31, 2023

(54) PRESSURIZED CATALYTIC PRODUCTION OF DIOXIDE SPECIES

(71) Applicant: DRIPPING WET WATER, INC., San Antonio, TX (US)

(72) Inventors: Richard Sampson, San Antonio, TX (US); Allison Sampson, San Antonio, TX (US); James Andrew Mialkowski, San Antonio, TX (US); Mauricio Mata Nieto, San Antonio, TX (US)

(73) Assignee: DRIPPING WET WATER, INC., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,193

(22) Filed: Oct. 5, 2021

(65) Prior Publication Data

US 2022/0024763 A1    Jan. 27, 2022

Related U.S. Application Data

(63) Continuation of application No. 16/432,485, filed on Jun. 5, 2019, now Pat. No. 11,142,455.

(51) Int. Cl.
*C01B 11/02* (2006.01)
*B01J 21/16* (2006.01)

(52) U.S. Cl.
CPC ............. *C01B 11/024* (2013.01); *B01J 21/16* (2013.01)

(58) Field of Classification Search
CPC .............................. C01B 11/024; B01J 21/16
See application file for complete search history.

(56) References Cited

U.S. PATENT DOCUMENTS

| | | |
|---|---|---|
| 3,619,110 A | 11/1971 | Borezee |
| 3,619,650 A | 11/1971 | Marchfelder |
| 3,684,437 A | 8/1972 | Callerame |
| 3,828,097 A | 8/1974 | Callerame |
| 3,857,737 A | 12/1974 | Kemp et al. |
| 3,936,502 A | 2/1976 | Barber |
| 4,006,095 A | 2/1977 | Hoffman et al. |
| 4,269,619 A | 5/1981 | Bilofsky |
| 4,504,442 A | 3/1985 | Rosenblatt et al. |
| 4,662,747 A | 5/1987 | Isaacson |
| 4,681,739 A | 7/1987 | Rosenblatt et al. |
| 4,880,711 A | 11/1989 | Luczak et al. |
| 4,925,645 A | 5/1990 | Mason |
| 5,008,096 A | 4/1991 | Ringo |
| 5,059,406 A | 10/1991 | Sheth et al. |

(Continued)

FOREIGN PATENT DOCUMENTS

| | | |
|---|---|---|
| EP | 0365501 | 4/1990 |
| GB | 791680 | 3/1958 |

OTHER PUBLICATIONS

Grant et al. Grant & Hackh's Chemical Dictionary, 5th Edition, 1987, p. 118.

(Continued)

*Primary Examiner* — James A Fiorito
(74) *Attorney, Agent, or Firm* — Jacobson Holman PLLC

(57) ABSTRACT

A packed bed catalyst in a pressurized vessel/reactor during contact with a dioxide species precursor enhances catalytic (Continued)

conversion of the precursor to the dioxide species, compared with the same catalytic conversion performed in a non-pressurized vessel/reactor.

17 Claims, 3 Drawing Sheets

(56) References Cited

U.S. PATENT DOCUMENTS

| | | | |
|---|---|---|---|
| 5,078,908 | A | 1/1992 | Ripley et al. |
| 5,100,652 | A | 3/1992 | Kross et al. |
| 5,116,620 | A | 5/1992 | Chvapil et al. |
| 5,122,285 | A | 6/1992 | Mason |
| 5,185,161 | A | 2/1993 | Davidson |
| 5,324,477 | A | 6/1994 | Schroder |
| 5,391,533 | A | 2/1995 | Peterson et al. |
| 5,435,984 | A | 7/1995 | Daly et al. |
| 5,639,436 | A | 6/1997 | Benson |
| 5,651,996 | A | 7/1997 | Roozdar |
| 5,820,822 | A | 10/1998 | Kross |
| RE36,064 | E | 1/1999 | Davidson et al. |
| 6,024,850 | A | 2/2000 | Sampson et al. |
| 6,063,425 | A | 5/2000 | Kross et al. |
| 6,077,495 | A | 6/2000 | Speronello et al. |
| 6,123,966 | A | 9/2000 | Kross |
| 6,200,557 | B1 | 3/2001 | Ratcliff |
| 6,238,643 | B1 | 5/2001 | Thangaraj et al. |
| 6,265,343 | B1 | 7/2001 | Daly et al. |
| 6,287,533 | B1 | 9/2001 | Khan et al. |
| 2001/0001655 | A1 | 5/2001 | Kuke |
| 2002/0037248 | A1 | 3/2002 | Bechberger |
| 2004/0071627 | A1 | 4/2004 | DiMascio |
| 2005/0079230 | A1 | 4/2005 | Lee |
| 2006/0280673 | A1 | 12/2006 | DiMascio |
| 2007/0231220 | A1 | 10/2007 | Agius et al. |
| 2008/0292534 | A1 | 11/2008 | Richardson et al. |
| 2018/0099882 | A1 | 4/2018 | Martin |

OTHER PUBLICATIONS

White, Geo Clifford, Handbook of Chlorination and Alternative Disinfectants, $4^{th}$ Edition, 1999, pp. 1153-1202.

Gordon et al. The Chemistry of Chlorine Dioxide, Progress in Inorganic Chemistry, vol. 15, 1972, pp. 201-286.

Helfferich, Ion Exchange, 1995, pp. 519-550.

Duolite Ion-Exchange Manual, Chemical Process Company, 1960.

McPeak et al. Iron in Water and Processes for its Removal, $21^{st}$ Annual Liberty Bell Corrosion Course, 1983.

Manganese Greensand CR & IR, Iversand Company; 1998.

Masschelein, Chlorine Dioxide, Chemistry and Environmental Impact of Oxychlorine Compounds, Ann Arbor Science Publishers, Inc. 1979.

XP-002227957; JP 6271301; Suido Kiko Co. Ltd; 1994, abstract.

Aieta et al. Determination of chlorine dioxide, chlorine chlorie and chlorate in water, American Water Works Associate, Journal, vol. 76, No. 1, 1984, pp. 64-70.

National Exposure Research Laboratory, U.S. Environmental Protection Agency: Method 300.1, Determination of inorganic anions in drinking water by ion chromatography, 1999, pp. 300.1-1-300.1-39.

Vogt, Helmut et al. Chlorine Oxides and Chlorine Oxygen Acids, 5. Chlorine Dioxide. Ullmann's Encyclopedia of Industrial Chemistry, vol. 8, Apr. 14, 2010, pp. 637-652.

Lentech, Disinfectants Chlorine Dioxide, 2009, pp. 1-5 taken from https://web.archive.org/web/20090922222758/http://www/lenntech.com/processes/disinfection/chemical/disinfectants-chlorine-dioxide.htm.

Gates, Don, PhD, The Chlorine Dioxide Handbook, Water Disinfection Series, AWWA, 1998.

Lewatit, Bayer AG, Catalytic Removal fo Dissolved Oxygen from Water.

Dence et al. Pulp Bleaching Principles and Practice, Tappi Press, 1996.

Simpson et al. A Focus on Chlorine Dioxide: The "Ideal" Biocide.

Encyclopedia.com, Mechanism of Catalysis.

US 11,802,048 B2

PRESSURIZED CATALYTIC PRODUCTION OF DIOXIDE SPECIES

FIELD OF THE INVENTION

The present invention relates to generating aqueous chlorine dioxide from chlorine dioxide precursors. In particular, the present invention relates to catalytically converting one or both of aqueous chlorous acid and aqueous chloric acid to aqueous chlorine dioxide.

BACKGROUND OF THE INVENTION

Chlorine dioxide (molecular formula $ClO_2$) is a well-known disinfectant and cleanser that can be generated using chlorous acid as a starting material. Chlorous acid (molecular formula $HClO_2$) occurs when there is an essentially complete substitution of the counter cation of the anion chlorite ($ClO_2^-$) with hydrogen ion ($H^+$). Chloric acid (molecular formula $HClO_3$) occurs when there is an essentially complete substitution of the counter cation of the anion chlorate ($ClO_3^-$) with hydrogen ion ($H^+$).

The generation of aqueous chlorous acid by the acidification of an aqueous chlorite salt solution (sometimes misnamed stabilized aqueous chlorine dioxide solution) is well known. In fact, whether an aqueous solution contains a chlorite salt or chlorous acid depends upon the solution pH, with chlorous acid being essentially exclusively present at a sufficiently low pH, e.g., at pH below 1.7, and chlorite salt being exclusively present at a sufficiently high pH, e.g., at pH 8.5. A mixture of chlorous acid and chlorite salt is present at pH's in between. Below a pH of 4 chlorous acid predominates, and above that pH, chlorite is the predominate species. See Gilbert Gordon, "The Chemistry of Chlorine Dioxide," *Progress in Inorganic Chemistry: Volume* 15, Ed. S. J. Lippard, 1972, 201-286 (Gordon), the disclosure of which is incorporated by reference as if fully set forth herein.

The speed of the catalytic reaction to chlorine dioxide depends on the ratio of chlorous acid to chlorite in the aqueous solution. It Is also known that, over time, aqueous chlorous acid slowly converts to chlorine dioxide. This slow conversion predominates in solutions containing low acid and high chlorite concentrations, making the reaction difficult to control, especially in high alkalinity water supplies. It is further well known that in an oxidizing environment, such as in the presence of chlorine or an anode, chlorine dioxide can be generated from chlorous acid.

U.S. Pat. No. 7,087,208 (hereinafter "US'208"), the disclosure of which is incorporated by reference as if fully set forth herein, teaches packing a reaction vessel with water-insoluble, catalytic particles, continuously passing a stream of aqueous chlorous acid into the vessel and through the catalytic particles, thereby catalytically converting the chlorous acid in the stream to chlorine dioxide, and then continuously removing from the vessel the stream of aqueous (generated) chlorine dioxide.

SUMMARY OF THE INVENTION

Accordingly, the present invention provides an improvement in the aforesaid method of catalytically generating chlorine dioxide according to U.S. Pat. No. '208. More precisely, it has been surprisingly discovered that by pressurizing the reaction vessel, either continuously or intermittently, while the catalytic particles are flooded with a chlorous acid/chloric acid solution significantly increases the conversion rate to chlorine dioxide.

Therefore, the present invention provides a process for generating aqueous chlorine dioxide which comprises the steps of establishing or providing a pressurizable reaction vessel holding a packed bed of porous, water-insoluble catalytic particles and having a vessel inlet and vessel outlet, continuously or intermittently feeding an aqueous solution containing at least one of chlorous acid and chloric acid through the vessel inlet into contact with the packed bed of porous, water-insoluble catalytic particles under continuous or intermittent pressurization to produce an aqueous chlorine dioxide solution, and continuously or intermittently removing the thus produced aqueous chlorine dioxide solution from the vessel through the vessel outlet.

By pressurizing the reaction vessel, pressure is applied to the packed bed flooded with chlorous acid/chloric acid solution, such that little or no fluidization of the packed bed occurs. Applying pressure to the acid feed or to the packed bed separately before contacting the bed with the solution would not have the desired effect; pressure whether continuous or intermittent must be applied to the packed bed when flooded with the acid solution in order to improve (increase) the rate of catalytically converting, i.a., aqueous chlorous acid into aqueous chlorine dioxide as taught in U.S. Pat. No. '208.

FURTHER DESCRIPTION OF THE INVENTION

Figure 1:
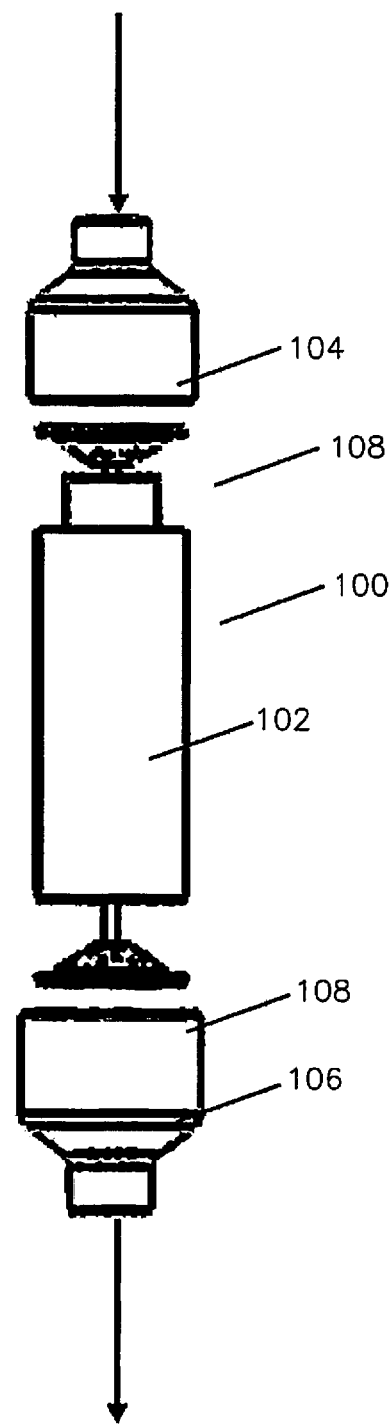
FIG. 1 shows an exploded elevational view of a plastic tube (vessel) used in Examples 1 and 4.

As used herein the following terms will have the meanings stated. The term "chlorous acid" refers to a solution whereby there has been an essentially complete substitution of the counter cation of the anion chlorite ($ClO_2^+$) with hydrogen ion ($H^+$) ("aqueous chlorous acid solution," "aqueous chlorous acid," and "chlorous acid solution" are used synonymously herein). According to Gordon, chlorous acid predominately exists (over chlorite) in solution at a pH less than 4. The term "chloric acid" refers to a solution whereby there has been an essentially complete substitution of the counter cation of the anion chlorate ($ClO_{3+}$) with hydrogen ion ($H^+$) ("aqueous chloric acid solution," "aqueous chloric acid," and "chloric acid solution" are used synonymously herein). Similar to chlorous acid, an aqueous chloric acid solution predominately exists (over chlorate) at a pH less than 4. The term "water-insoluble" means a substance incapable of being dissolved. The term "packed bed of . . . particles" means water-insoluble particles held together in constant contact with each other, such as, e.g., contained in a tube, pipe, or other vessel filled (completely) with the particles. The term "acid solution" refers to either a chlorous acid and/or chloric acid solution.

In accordance with the present invention, feeding of acid solution and removing of chlorine dioxide solution are at the same rate and at the same regular or irregular intervals. Feeding and removing can occur over intervals ranging as low as about 1 second to as long as about 1 week; however, the feeding and removing are preferably carried out continuously. The feeding and removing rates of the solutions fed to and removed from the reaction vessel containing the catalytic particles will depend at least in part upon the size of the reaction vessel and related equipment and can be readily determined by those skilled in the art. The pressure applied to the reaction vessel containing the catalytic particles and the chlorous acid and chloric acid solution to be converted should best be applied within the range of about 5 psi and about 250 psi, and preferably between about 25 psi and 60 psi. The porous, water-insoluble catalytic particles have particle sizes ranging generally about 4 to about 50 US mesh, preferably about 4 to about 40 US mesh. The catalytic particles must be water-insoluble to ensure the bed stays packed.

The porous, water-insoluble catalytic particles are completely made of one or more water insoluble catalysts, or made of porous, water-insoluble inorganic particles having one or more water-insoluble catalysts deposited thereon in a waterproof manner. How to obtain both the particles completely made of one or more water insoluble catalysts, and those made of porous, water-insoluble inorganic particles having one or more water-insoluble catalysts deposited thereon in a waterproof manner will be readily apparent to one of ordinary skill in the art. Exemplary catalysts include platinum group metals, platinum group metal oxides, transition group metals, and transition group metal oxides. Preferred catalysts include platinum, palladium, manganese dioxide, carbon, and ion exchange material. Suitable commercially available catalysts include inorganic cation resin in the hydrogen form having platinum catalyst placed on the surface of the inorganic cation resin sold by ResinTech Inc. at 160 Cooper Rd, West Berlin, NJ under the name Resintech SIR-600 and inorganic clay having platinum catalyst placed on the surface of the inorganic clay sold by Wateropolis Corp. on 12375 Kinsman Rd, Newbury Township, OH under the name Ceralite-A.

Referring now to FIG. 1, there is shown a basic vessel used to contain a packed bed catalytic material. The catalytic material can be packed in such way that the particles are compacted and are in contact with each other. This packed bed is contained within the basic vessel such that the inlet and outlet prevent the packed material from being able to leave the vessel.

Figure 2:
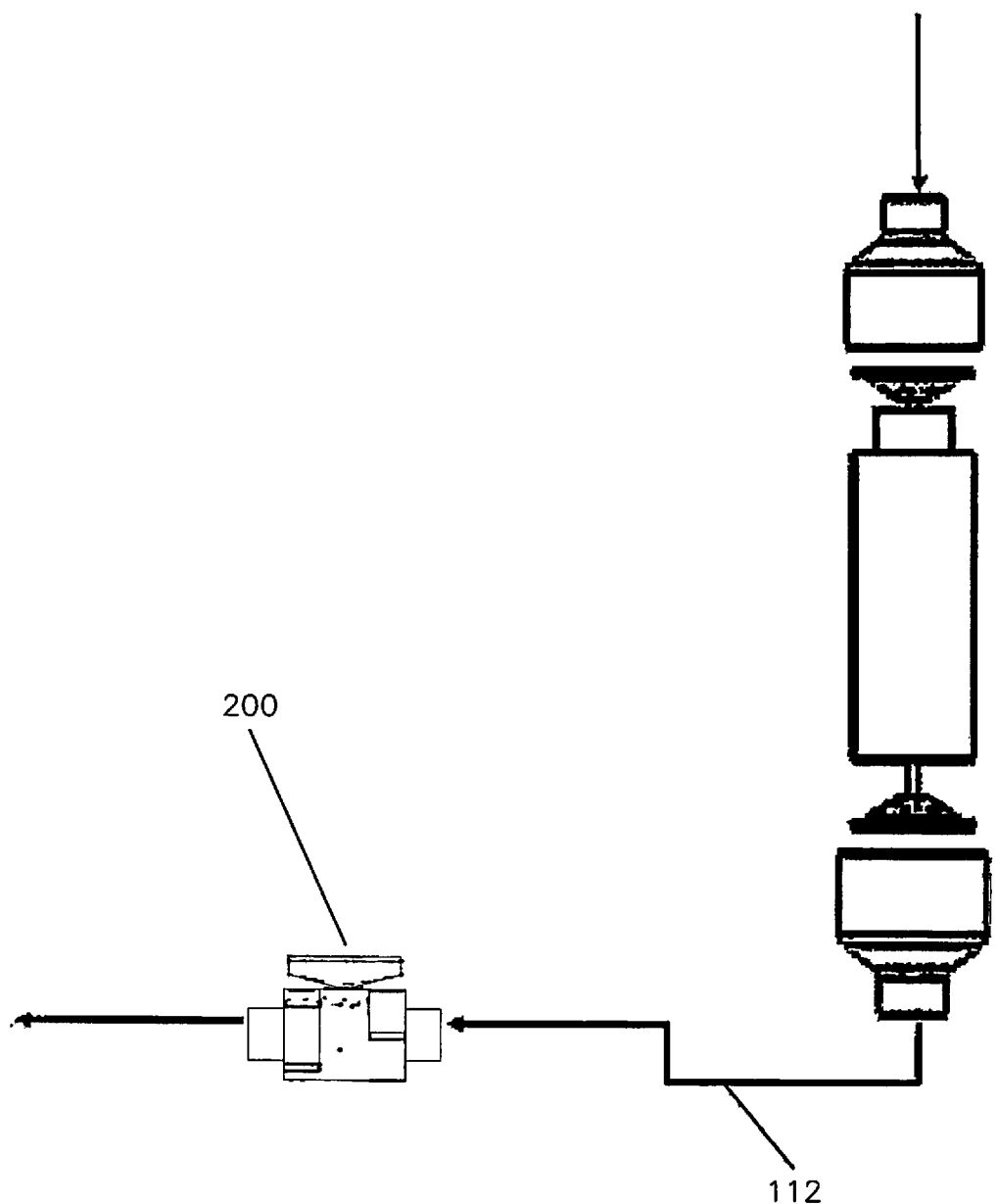
FIG. 2 shows an exploded elevational view of a plastic tube and a ball valve used in Examples 2 and 5.

In the embodiment shown in FIG. 2, the packed vessel is pressurized and maintained using a ball valve. This pressure on the packed catalytic material held within the vessel can be produced using any means so as to ensure that constant pressure, either continuous or intermittent, is being applied to the packed vessel.

Figure 3:
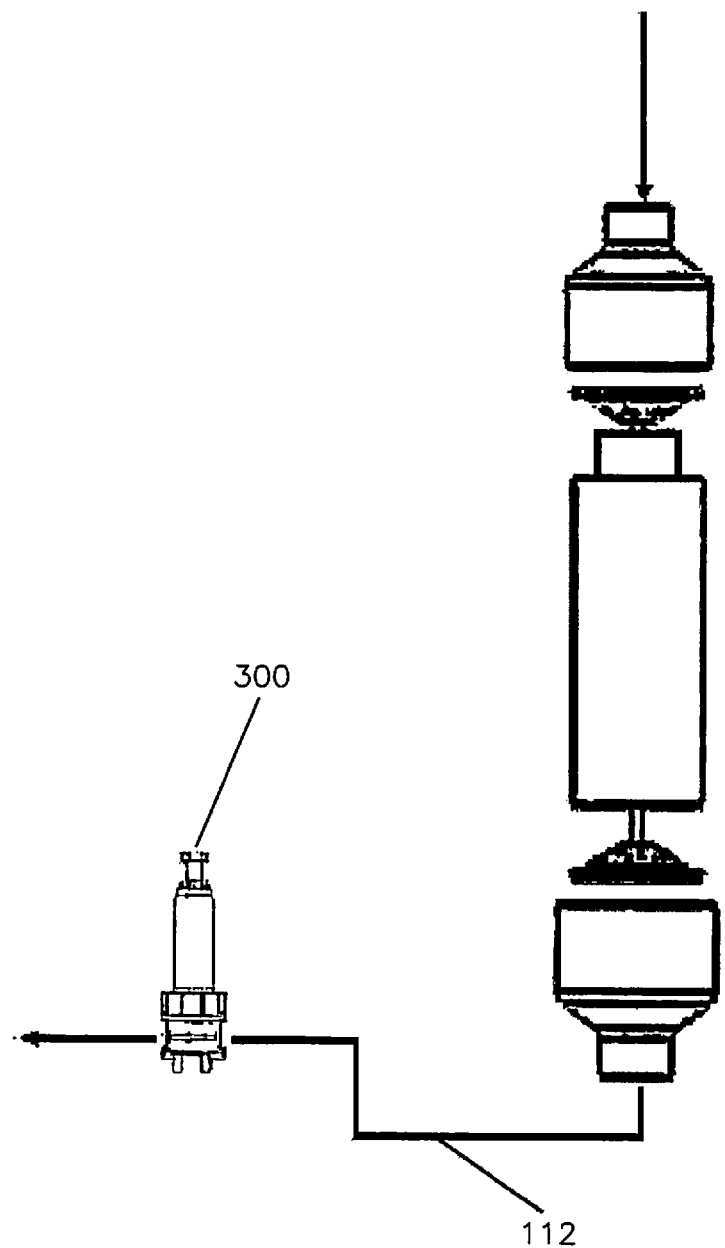
FIG. 3 shows an exploded elevational view of a plastic tube and a back-pressure regulator used in Examples 3 and 6.

In the embodiment shown in FIG. 3, a catalytic material is held within a packed vessel and to which constant pressure is maintained by use of a back-pressure regulating valve. The packed vessel can be held under pressure, either continuous or intermittent, during the generation of aqueous chlorine dioxide by any means that will keep said pressure on the packed vessel constant or nearly constant.

Plastic tubes used for carrying out the tests set forth in Examples 1-6 below are shown in FIG. 1, FIG. 2, and FIG. 3 where numerals in the drawings refer to like parts throughout. The plastic test tube 100 includes a generally cylindrical body 102 having a conventional connection closure mounted at each end thereof in the form of an inlet upper end connection 104 and an outlet lower end connection 106. PVC (polyvinyl chloride) screens 108 which fit over the inner diameter of the cylindrical tube 102 are glued at each end between the end of the cylindrical tubing 102 and the end closures 104 and 106 to act as support for the packed-bed filling. Outlet tubing 112 runs from the outlet end connection 106 (see FIGS. 2 and 3). A true union ball valve 200 manufactured by Spears at 15853 Olden St, Sylmar, CA, is connected to the tubing downstream of the packed vessel 102 to start and stop the removal of the stream of chlorous acid. An M-Series back-pressure valve 300 manufactured by Griffco Valve, Inc. at 188 Creekside Drive, Amherst, NY, is set to 25 psi downstream of the pressure vessel to apply back-pressure to the solution.

Precursor Solution: In Examples 1-6, a chlorite precursor solution is used for each set of Examples. The chlorite precursor solution is prepared by diluting an aqueous 25% active sodium chlorite solution with reverse osmosis water to a concentration of 1250 ppm. Before beginning each of the following examples, the chlorite precursor solution is converted to chlorous acid by appropriate acidification. In example 7-8, a chlorate precursor solution is used for each set of Examples. The chlorate precursor solution is prepared by dissolving powdered sodium chlorate into reverse osmosis water to achieve a concentration of 1250 ppm. A powdered sodium bisulfite solution is then mixed into the chlorate precursor solution. The powdered sodium bisulfite solution weighed to be 1.33 more than what the powdered sodium chlorate weighed.

Example 1

Gravity Flow with SIR Catalyst

Chlorine dioxide is generated by gravity feeding chlorous acid through a 30 ml plastic tube 102 as shown in FIG. 1. The tube is packed with the commercially available Resintech SIR-600 catalyst described above, such that the tube is full. A 10 ml sample of the chlorous acid solution at a pH of 1.8 as converted from the sodium chloride precursor solution is then poured into the plastic tube at atmospheric pressure and collected at atmospheric pressure as the solution comes out of the plastic tube. The flow through of the sample takes only a few seconds. The 10 ml sample of solution is taken from the outlet connection 106, and a Hach Spectrophotometer is used for the measurement of the chlorine dioxide concentration immediately after the sample is collected. The foregoing test was repeated with four additional 10 ml samples. Table 1 records the chlorine dioxide concentration conversion as measured for each of the 5 trials.

Example 2a

Static Contact Time Test with SIR Catalyst

One 30 ml plastic tube with a ball valve 200 on the downstream side of tubing 112 as shown in FIG. 2 is clipped to a wall with pipe clips. The tube is packed with the same Resintech SIR-600 catalyst as in Example 1, such that the tube is full. The chlorous acid solution at a pH of 1.8 as converted from the sodium chloride precursor solution is then fed into the plastic tube at atmospheric pressure, and once the packed bed is flooded the ball valve 200 is closed. The solution stayed within the packed bed catalyst open to atmospheric pressure for five minutes. The chlorous acid solution is then removed at atmospheric pressure and collected and a Hach Spectrophotometer is used for the measurement of chlorine dioxide immediately after the sample is collected. The chlorine dioxide concentration conversion is recorded in Table 1.

Example 2b

Static Pressure Test with SIR Catalyst

One 30 ml plastic tube with a ball valve 200 on the downstream side of tubing 112 as shown in FIG. 2 is clipped to a wall with pipe clips. The tube is packed with the same Resintech SIR-600 catalyst as in Examples 1 and 2a, such that the tube is full. The chlorous acid solution at a pH of 1.8 as converted from the sodium chloride precursor solution is then fed into the plastic tube. Once the packed bed is flooded with the chlorous acid solution the ball valve is closed, and the inlet pressure is increased to a pressure of 60 psi. The solution stays under static pressure at 60 psi in the plastic tube for five minutes. The chlorous acid solution is then removed and collected and a Hach Spectrophotometer is used for the measurement of chlorine dioxide immediately after the sample is collected. The chlorine dioxide concentration conversion is recorded in Table 1.

Example 3

Dynamic Pressure Test with SIR Catalyst

One 30 ml plastic tube with a back-pressure regulator 300 on the downstream side of tubing 112 as shown in FIG. 3 is clipped to a wall with pipe clips. The tube is packed with the same Resintech SIR-600 catalyst as in Examples 1, 2a and 2b, such that the tube is full. A back pressure is applied continuously by regulator 300 at a constant pressure of 25 psi. The chlorous acid solution at a pH of 1.8 as converted from the sodium chloride precursor solution is then continuously fed into the packed tube and removed at the same rate it is being fed. Five samples are taken every 5 minutes. These samples are measured for chlorine dioxide with a Hach Spectrophotometer immediately after each sample is collected. The chlorine dioxide concentration conversion is recorded in Table 1.

Example 4

Gravity Flow with Clay Catalyst

The five trials set forth in Example 1 are here repeated, except the 30 ml plastic tube is packed with the commercially available inorganic clay Ceralite-A catalyst described above, such that the tube is full. A 10 ml sample of chlorous acid solution at a pH of 1.8 as converted from the sodium chloride precursor solution then poured into the plastic tube at atmospheric pressure and collected at atmospheric pressure as the solution comes out of the plastic tube, and a Hach Spectrophotometer is used for the measurement of chlorine dioxide immediately after the sample is collected. Table 2 records the chlorine dioxide concentration conversion as measured for each of the five trials.

Example 5a

Static Contact Time Test with Clay Catalyst

The test set forth in Example 2a is here repeated, except the 30 ml plastic tube is packed with the same Ceralite-A catalyst as used in Example 4, such that the tube is full. The chlorous acid solution at a pH of 1.8 as converted from the sodium chloride precursor solution is then fed into the plastic tube at atmospheric pressure, and once the packed bed is flooded the ball valve 200 is closed. The solution stayed within the packed bed catalyst open to atmospheric pressure for five minutes. The chlorous acid solution is then removed at atmospheric pressure and collected; and a Hach Spectrophotometer is used for the measurement of chlorine dioxide immediately after the sample is collected. The chlorine dioxide concentration conversion as measured is recorded in Table 2.

Example 5b

Static Pressure Test with Clay Catalyst

The test set forth in Example 2b is here repeated, except the 30 ml plastic tube is packed with the same Ceralite-A catalyst as used in Example 4, such that the tube is full. The chlorous acid solution at a pH of 1.8 as converted from the sodium chloride precursor solution is then fed into the plastic tube, and once the packed bed is flooded the ball valve 200 is closed, and the inlet pressure is increased to a pressure of 60 psi. The solution stays under static pressure at 60 psi in the plastic tube for five minutes. The chlorous acid solution is then removed and collected and a Hach Spectrophotometer is used for the measurement of chlorine dioxide immediately after the sample is collected. The chlorine dioxide concentration conversion as measured is recorded in Table 2.

Example 6

Dynamic Pressure Test with Clay Catalyst

The test set forth in Example 3 is here repeated, except the 30 ml plastic tube with back-pressure regulator 300 on the downstream side as shown in FIG. 3 is packed with the same Ceralite-A catalyst placed as used in Examples 4, 5a and 5b, such that the tube is full. A back pressure is applied continuously at a constant pressure of 25 psi. The chlorous acid at a pH of 1.8 as converted from the sodium chloride precursor solution is then continuously fed into the packed tube and removed at the same rate at which it is being fed. Five samples are taken each every 5 minutes. These samples are measured for chlorine dioxide with a Hach Spectrophotometer immediately after each sample is collected. Table 2 records the chlorine dioxide concentration conversion as measured for each of the five samples.

Example 7

Gravity Flow Test with SIR Catalyst

One 30 ml plastic tube with a ball valve on the downstream side as shown in FIG. 2 is clipped to a wall with pipe clips and is packed with the same Resintech SIR-600 catalyst as used in Examples 1-3, such that the tube is full. A 10 ml sample of the chlorous acid solution at a pH of 1.8 converted from the chlorite precursor solution is then poured into the plastic tube and collected as the solution comes out of the plastic tube. The 10 ml sample of solution is taken, and a Hach Spectrophotometer is used for the measurement of the chlorine dioxide concentration immediately after the sample is collected. The above test is repeated an additional eleven times at five minute intervals. Table 3 shows the average concentration of the twelve (12) samples over a 55 minute period.

Example 8

Dynamic Pressure Test with SIR Catalyst

One 30 ml plastic tube with a back-pressure regulator on the downstream side as shown in FIG. 3 is clipped to a wall with pipe clips and is packed with the same Resintech SIR-600 catalyst used in Examples 1-3 and 7, such that the tube is full. Back pressure is applied continuously at a constant pressure of 25 psi. The chlorous acid solution converted from the chlorite precursor solution is then continuously fed into the packed tube and the existing solution is removed at the same rate. Samples are taken every 5 minutes for an hour for a total of 12 samples. These 12 samples are measured for chlorine dioxide with a Hach Spectrophotometer. The average is displayed in Table 3.

TABLE 1

| | Example 1 | | | Example 2a | | | Example 2b | | | Example 3 | |
|---|---|---|---|---|---|---|---|---|---|---|---|
| Trial | $ClO_2$ Concentration | % Conversion | Trial | $ClO_2$ Concentration | % Conversion | Trial | $ClO_2$ Concentration | % Conversion | Time (min) | $ClO_2$ Concentration | % Conversion |
| 1 | 329 | 35.9 | 1 | 599 | 65.4 | 1 | 732 | 79.8 | 0 | 748 | 80 |
| 2 | 553 | 60.3 | | | | | | | 5 | 764 | 80 |
| 3 | 575 | 62.7 | | | | | | | 10 | 779 | 80 |
| 4 | 593 | 64.7 | | | | | | | 15 | 770 | 80 |
| 5 | 584 | 63.7 | | | | | | | | | |

TABLE 2

| | Example 4 | | | Example 5a | | | Example 5b | | | Example 6 | |
|---|---|---|---|---|---|---|---|---|---|---|---|
| Trial | $ClO_2$ Concentration | % Conversion | Trial | $ClO_2$ Concentration | % Conversion | Trial | $ClO_2$ Concentration | % Conversion | Time (min) | $ClO_2$ Concentration | % Conversion |
| 1 | 431 | 47.6 | 1 | 551 | 60.1% | 1 | 733 | 80 | 0 | 823 | 80 |
| 2 | 472 | 52.2 | | | | | | | 5 | 824 | 80 |
| 3 | 466 | 51.5 | | | | | | | 10 | 822 | 80 |
| 4 | 423 | 46.8 | | | | | | | 15 | 809 | 80 |
| 5 | 524 | 58.0 | | | | | | | | | |

TABLE 3

| | AVG $ClO_2$ Concentration Over 1 Hour |
|---|---|
| Example 7 | 5 mg/L |
| Example 8 | 32 mg/L |
| % Increase | 540% |

The invention claimed is:

1. A process for generating aqueous chlorine dioxide comprising the steps of:
providing a pressurizable vessel holding a packed bed of porous, water-insoluble catalytic particles capable of converting chlorous acid and chloric acid to chlorine dioxide and having a particle size of about 4 to about 50 US mesh, said vessel having an inlet and an outlet;
continuously or intermittently feeding an aqueous solution containing at least one of chlorous acid and chloric acid at a pH less than 4 through the vessel inlet into contact with the packed bed of porous, water-insoluble catalytic particles under continuous or intermittent pressurizing independent of applying pressure to the feeding to produce an aqueous chlorine dioxide solution; and
continuously or intermittently removing said produced aqueous chlorine dioxide solution from the packed bed and the vessel through the vessel outlet.

2. The process of claim 1 wherein each of the feeding, removing, and pressurizing is continuous.

3. The process of claim 1 wherein each of the feeding, removing, and pressurizing is intermittent.

4. The process of claim 1, wherein the continuous or intermittent pressurizing of the catalytic particles is between about 5 psi and about 250 psi.

5. A process for generating aqueous chlorine dioxide comprising the steps of:

providing a pressurizable vessel filled with a packed bed of porous, water-insoluble catalytic particles capable of converting a precursor selected from the group consisting of at least one of chlorous acid and chloric acid to chlorine dioxide, said vessel having an inlet and an outlet;
feeding at a rate to the packed bed, through the vessel inlet, an aqueous solution containing the precursor at a pH less than 4 to flood the packed bed with the aqueous precursor solution in order to convert the precursor to chlorine dioxide,
pressurizing the flooded packed bed in the vessel to a pressure greater than applied in the feeding step, to increase the conversion rate of the precursor to chlorine dioxide, and
thereafter removing the aqueous chlorine dioxide from the packed bed through the vessel outlet at the same rate as the feeding step.

6. The process of claim 5 wherein the catalytic particles are selected from the group consisting of platinum group metals, platinum group metal oxides, transition group metals, and transition group metal oxides.

7. The process of claim 5 wherein the catalytic particles are selected from the group consisting of platinum, palladium, manganese dioxide, carbon, and ion exchange material.

8. The process of claim 5 wherein pressurizing the flooded packed bed in the vessel is at a pressure between about 5 psi and about 250 psi.

9. The process of claim 5 wherein the feeding, pressurizing, and removing steps are continuous.

10. The process of claim 9 wherein the pressurizing step is effected by continuously applying a back pressure through the vessel outlet while continuously removing the aqueous chlorine dioxide at the same rate as continuously feeding the aqueous precursor solution.

11. The process of claim 9 wherein pressurizing the flooded packed bed in the vessel is at a pressure between about 5 psi and about 250 psi.

12. The process of claim 5 wherein the feeding and removing steps are intermittent, occurring at the same regular or irregular intervals, and the pressurizing step is intermittent.

13. The process of claim 12 wherein the pressurizing step is effected by intermittently halting removing the aqueous chlorine dioxide from the vessel outlet and contemporaneously increasing pressure applied to the flooded bed through the vessel inlet.

14. The process of claim 12 wherein pressurizing the flooded packed bed in the vessel is at a pressure between about 5 psi and about 250 psi.

15. The process of claim 12 wherein the catalytic particles are selected from the group consisting of platinum group metals, platinum group metal oxides, transition group metals, and transition group metal oxides.

16. The process of claim 1 wherein each of the feeding and removing steps is intermittent and the pressurizing step is continuous.

17. The process of claim 1 wherein the catalytic particles are selected from the group consisting of platinum group metals, platinum group metal oxides, transition group metals, and transition group metal oxides.

* * * * *